(12) United States Patent
Yamakita

(10) Patent No.: US 8,743,435 B2
(45) Date of Patent: Jun. 3, 2014

(54) IMAGE READING APPARATUS

(75) Inventor: Hideto Yamakita, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 336 days.

(21) Appl. No.: 13/108,833

(22) Filed: May 16, 2011

(65) Prior Publication Data

US 2011/0286051 A1 Nov. 24, 2011

(30) Foreign Application Priority Data

May 18, 2010 (JP) ................................. 2010-113976

(51) Int. Cl.
*H04N 1/46* (2006.01)
*H04N 1/04* (2006.01)
*H04N 1/36* (2006.01)

(52) U.S. Cl.
USPC ........... 358/514; 358/412; 358/409; 358/483; 358/482; 358/496; 358/474; 358/475; 358/505; 358/509

(58) Field of Classification Search
USPC ......... 358/409, 412, 404, 444, 474, 486, 488, 358/496, 498, 442, 468, 505, 524, 483, 482, 358/475, 509, 514; 399/367; 348/312
See application file for complete search history.

(56) References Cited

U.S. PATENT DOCUMENTS

| | | | | |
|---|---|---|---|---|
| 6,972,876 B2 * | 12/2005 | Yokochi | ......................... | 358/471 |
| 7,071,979 B1 | 7/2006 | Ohtani et al. | | |
| 7,136,200 B2 * | 11/2006 | Chen et al. | .................... | 358/474 |
| 7,202,981 B2 * | 4/2007 | Wang | ............................ | 358/486 |
| 7,345,797 B2 * | 3/2008 | Jones | ............................ | 358/496 |
| 7,460,257 B2 * | 12/2008 | Lee | .............................. | 358/1.15 |
| 7,535,603 B2 | 5/2009 | Suga | | |
| 8,004,724 B2 * | 8/2011 | Sakamoto | ..................... | 358/412 |
| 8,040,577 B2 * | 10/2011 | Akiyama | ..................... | 358/486 |
| 8,310,742 B2 * | 11/2012 | Nozaki | ......................... | 358/514 |

FOREIGN PATENT DOCUMENTS

| | | |
|---|---|---|
| CN | 101094295 A | 12/2007 |
| JP | 10-23219 A | 1/1998 |
| JP | 2007-201672 A | 8/2007 |
| JP | 2009-246671 A | 10/2009 |

* cited by examiner

*Primary Examiner* — Cheukfan Lee
(74) *Attorney, Agent, or Firm* — Kilpatrick Townsend & Stockton LLP

(57) ABSTRACT

An image reading apparatus includes an ADF driven by a motor; an image reading unit transmitting charges accumulated in a photoelectric conversion element as a shift pulse to a shift register; and a shift pulse control unit controlling an output timing of the shift pulse based on rotation of the motor. When the rotation of the motor stops, the shift pulse control unit outputs the shift pulse to transmit the charges accumulated in lighting of a light source immediately before the stoppage of the motor.

7 Claims, 7 Drawing Sheets

CONTINUE IN FIG. 3

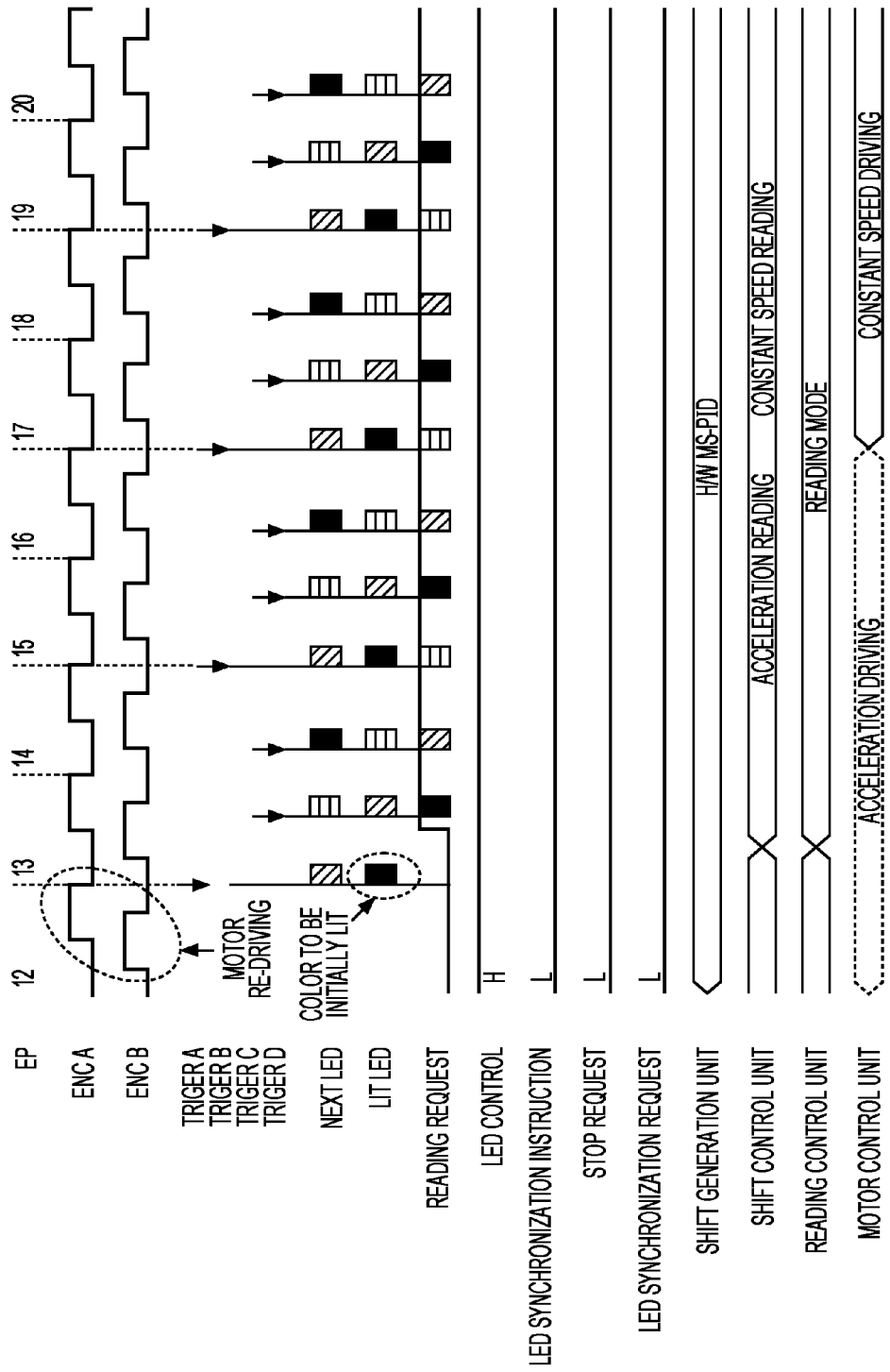

IMAGE READING APPARATUS

CROSS REFERENCES TO RELATED APPLICATIONS

The entire disclosure of Japanese Patent Application No. 2010-113976, filed May 18, 2010 is expressly incorporated by reference herein.

BACKGROUND

1. Technical Field

The present invention relates to an image reading apparatus.

2. Related Art

There is an image scanner (image reading apparatus) having an ADF (Auto Document Feeder) function (for example, JP-A-2007-201672). The image scanner reads the entire image of a document by an image sensor stopped while moving the document at a constant speed by rotating a sheet feeding motor.

The image scanner temporarily stores image data from the document in a buffer and sequentially transmits the image data to a host computer such as a personal computer (PC). A transmission speed is determined depending on the processing capability of the host computer. Therefore, a reading speed of the image scanner is adjusted to the degree that the buffer is not full.

However, even when the reading speed of the image scanner is adjusted, there are cases where the buffer becomes full. When the image scanner detects that the buffer is nearly full, the image scanner stops reading the image and the sheet feeding motor is stopped. After the full state of the buffer is released, the image scanner resumes the reading of the image.

Since the image data may not be transmitted to the host computer during the stoppage of the sheet feeding motor, the image data read before the stoppage of the sheet feeding motor has to be transmitted after the reading is restarted. In this case, since charges continue to be accumulated in the image sensor during the stoppage of the sheet feeding motor, dark noise may occur in the image data.

When LEDs (Light Emitting Diodes) of color to be lit are not lit at the time of resuming the reading, image data may not appropriately be read. However, the LEDs of colors to be lit (hereinafter, also referred to as "LED synchronization control") are not prepared for lighting during the stoppage of the sheet feeding motor, and thus the lighting of the LEDs has to be prepared after the reading. Then, line missing may occur in the image data.

SUMMARY

An advantage of some aspects of the invention is that it provides a technique for preventing deterioration in an image when reading is stopped.

According to an aspect of the invention, there is provided an image reading apparatus which includes: an ADF driven by a motor; an image reading unit transmitting charges accumulated in a photoelectric conversion element as a shift pulse to a shift register; and a shift pulse control unit controlling an output timing of the shift pulse based on rotation of the motor. When the rotation of the motor stops, the shift pulse control unit outputs the shift pulse to transmit the charges accumulated in last lighting of a light source.

BRIEF DESCRIPTION OF THE DRAWINGS

The invention will be described with reference to the accompanying drawings, wherein like numbers reference like elements.

FIG. 7 is a fourth diagram illustrating the lighting timing and each control signal of the LED light source in the image reading control.

DESCRIPTION OF EXEMPLARY EMBODIMENTS

Hereinafter, an embodiment of the invention will be described with reference to the drawings.

Figure 1:
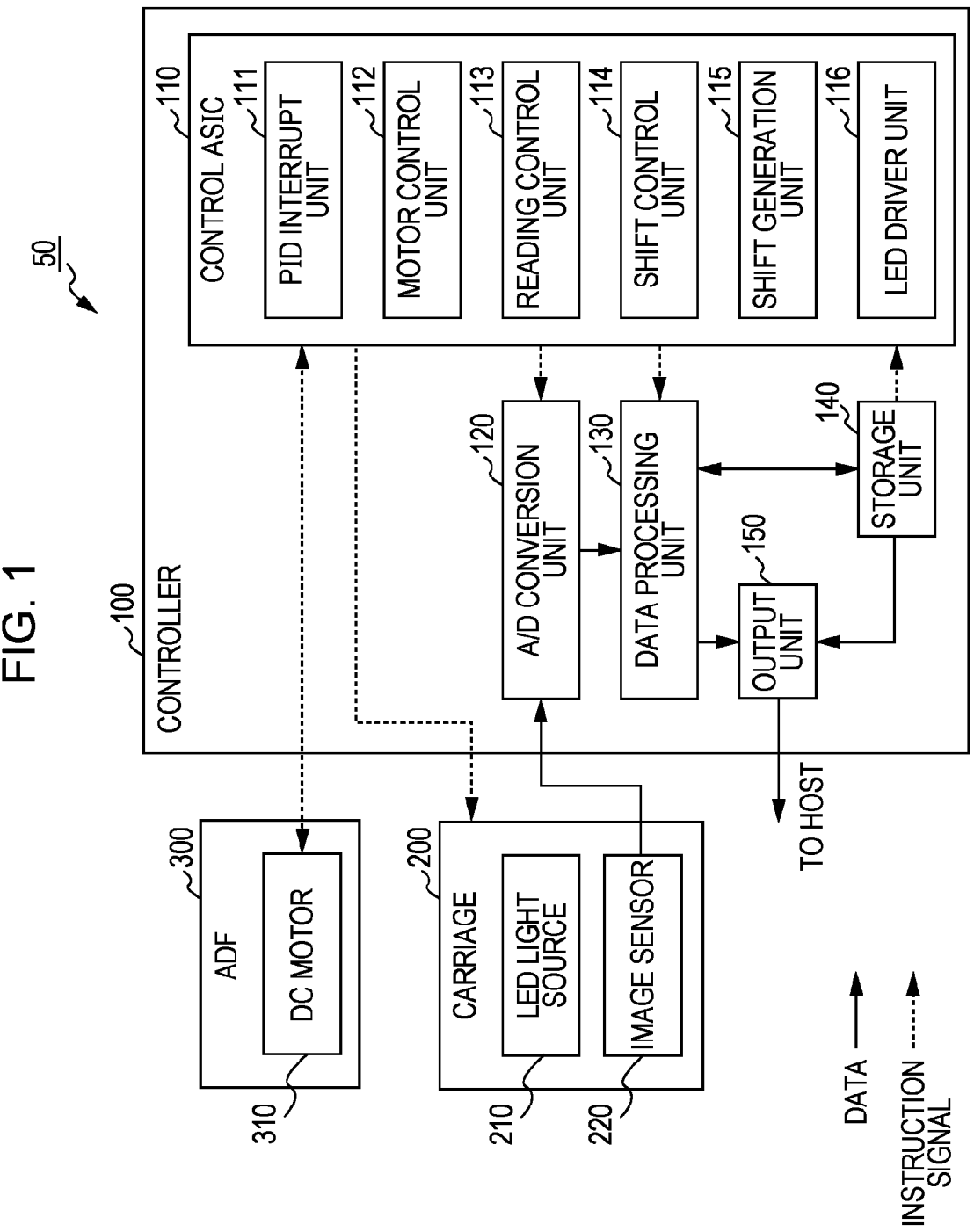
FIG. 1 is a block diagram illustrating an example of the overall configuration of an image reading apparatus according to an embodiment.

FIG. 1 is a block diagram illustrating an example of the overall configuration of an image reading apparatus 50 according to an embodiment of the invention.

The image reading apparatus 50 is a so-called flat bed type image reading apparatus including a document platen (not shown) on the upper surface of its case. The image reading apparatus 50 reads an image by emitting light from the lower side toward the document fixed on the document platen having a transparent plate and scanning an image sensor 210.

The image reading apparatus 50 includes: the document platen (not shown) on which a document serving as a medium to be read is placed; and a cover (not shown) covering a document placing surface (platen face) of the document platen and an image reading window from the upper side. The cover can be opened and closed since the cover is coupled with the document platen through a hinge mechanism.

An ADF (Auto Document Feeder) 300 incorporated with the cover is installed above the image reading window. The ADF 300 includes a DC motor 310, a sheet feeding tray (not shown), a transport roller (not shown), and a sheet discharging tray (not shown). Here, the rotation of the transport roller is controlled by the DC motor 310. The ADF 300 can send and pass a document placed on the sheet feeding tray to the upper surface of the image reading window. Moreover, the DC motor 300 includes an encoder which outputs a pulse according to a rotation amount (that is, a transport amount of a document) of the transport roller.

As illustrated, the image reading apparatus 50 includes a carriage 200 which is mounted with LED light sources 210 and an image sensor (for example, a CCD color image sensor) 220 and is disposed below the document platen. The image reading apparatus 50 further includes a carriage driving mechanism (not shown) which controls reciprocation movement of the carriage 200 and a controller 100 which controls the image reading apparatus 50 as a whole and performs various kinds of processings to read an image.

The carriage 200 conveys the image sensor 220 in a sub-scanning direction. The carriage 200 is slidably mounted on a guiding shaft or the like parallel to the image reading window and the platen face of the document platen. The carriage 200 is pulled and is reciprocated by a belt rotated by a motor of the carriage driving mechanism. The movement amount of the carriage 200 is controlled according to an output value of the encoder outputting the pulse according to the rotation amount of the motor of the carriage driving mechanism.

That is, the carriage driving mechanism includes the motor rotating the belt mounted on the carriage and the encoder outputting the pulse according to the rotation amount of the motor.

When a document is read while being transported by the ADF 300, the carriage 200 is fixed at a predetermined position below the image reading window.

The LED light sources 210 include a red (R) LED, a green (G) LED, and a blue (B) LED and generate light of three RGB colors in predetermined order. In this embodiment, when reading corresponding to one line of a normal document is performed, the LED light sources 210 generate light in order of the red LED, the green LED, and the blue LED. The same light emitting process is repeated in order to perform reading corresponding to the number of lines necessary for generating the image data of the document. The light emission time of each color LED is predetermined for each color. When the predetermined time passes after the lighting of each LED, the LED turns off. The LED light source 210 of each color lights up, when a predetermined current (current from a control ASIC 110 described below) is supplied.

The image sensor 220 receives the light reflected from the document, accumulates the charges corresponding to the amount of received light, and sends the accumulated charges as image reading data (electric signal) to the controller 100.

The image sensor 220 includes a plurality of sensor chips arranged in a main scanning direction. Each sensor chip has the same configuration as a general CIS (Contact Image Sensor) image sensor or a general CCD (Charge Coupled Device) image sensor. That is, each sensor chip includes a photoelectric conversion element (photodiode), a shift gate, and a shift register. The charges accumulated in the photoelectric conversion element are transmitted to the shift register via the shift gate, and then the charges are moved and output sequentially by the shift register.

The opening (charge transmission) of the shift gate is performed in response to application of a shift pulse (signal from the control ASIC 110 described below). Since the photoelectric conversion element usually accumulates charges according to the amount of received light, the transmission timing of the charges to the shift register is a start timing at which charges of the light of the subsequent light emission color are accumulated. The charges transmitted to the shift register are converted into electric signals (analog data) in an end output portion of the shift register, and then the electric signals are sent to an A/D conversion unit 120.

The charges stored in the shift register are output in response to a predetermined reading clock (signal from the control ASIC 110 described below). For example, the charges of one pixel are output for one clock as analog data.

The controller 100 includes the A/D conversion unit 120 converting analog data output from the image sensor 220 into digital data; a data processing unit 130 performing various kinds of corrections on the digital data output from the A/D conversion unit 120; a storage unit 140 storing correction data (white reference data or black reference data) used to perform various kinds of corrections by the data processing unit 130 and reading data (image data) to be corrected; an output unit 150 transmitting the data from the data processing unit 130 to a host computer such as a personal computer; and the control ASIC 110 controlling each functional unit of the controller 100 as a whole and controlling the LED light source 210 and the image sensor 220 of the carriage 200 and the carriage driving mechanism.

The A/D conversion unit 120 is realized by, for example, an AFE (Analog Front End) and converts the analog data output from the image sensor 220 into the digital data.

The data processing unit 130 performs various kinds of corrections, such as shading correction, on the digital data output from the A/D conversion unit 110 and outputs the result to the output unit 150.

The data processing unit 130 may be configured by a computer which includes a CPU serving as a main control device, a ROM storing programs or the like, and a RAM serving as a main memory and temporarily storing data. Of course, the data processing unit 130 may be configured by an ASIC (Application Specific Integrated Circuit) designed to be dedicated to various kinds of corrections.

The storage unit 140 is realized by, for example, a buffer. The storage unit 140 temporarily stores the digital data output from the A/D conversion unit 120 in a first-in first-out (FIFO) manner and transmits the data from the firstly stored data to the output unit 150 in order.

When the storage unit 140 detects the fact (near full state) that the stored data exceeds a predetermined amount of data (near full value), the storage unit 140 notifies the control ASIC 110 of the detection result. Moreover, when the storage unit 140 detects the near full state, the ADF 300 decreases the speed of the transport of the document and stops transporting the document. In this case, the storage unit 140 receives the data read during the decreasing of the speed. However, when the transporting of the document is stopped, the storage unit 140 stops receiving the data excluding data (R, G, and B) corresponding to one line finally read at the stopped position. The storage unit 140 performs only the transmitting of the data to the output unit 150 and does not receive the subsequent data (buffering stop) until the amount of data is less than a predetermined amount of data (free value) (memory free).

Hereinafter, the near full value and the free value which are the values of the amounts of data stored in the storage unit 140 will be described.

In this embodiment, even while the ADF 300 decelerates the transport of the document (step of decelerating the DC motor 310), the read data is transmitted to the storage unit 140. The near full value is the maximum limit of the amount of receivable data read during the step of decreasing the speed of the transport without fullness of the storage unit 140. In this embodiment, even after the transport of the document is stopped, data (R, G, and B) corresponding to one line read finally from the stopped position is transported to the storage unit 140. The near full value also includes the amount of data (R, G, and B) corresponding to one line read finally at the stopped position of the document (the DC motor 310).

On the other hand, when the reading is completely prepared, the ADF 300 resumes the transport of the document or the image sensor 220 resumes the reading. Here, the fact that the reading is completely prepared means that the amount of data stored by the storage unit 140 is less than a predetermined amount of data (free value). In addition, the free value is the maximum limit of the amount of data predetermined so that the storage unit 140 does not immediately come to be in the near full state even when the reading is resumed.

The output unit 150 is realized by an interface for achieving network connection or USB connection. The output unit 150 transmits the data stored in the storage unit 140 to the host computer (scanner control apparatus) at a transmission speed corresponding to the processing capability of the host computer.

The control ASIC 110 controls the ADF 300, the carriage 200, and the carriage driving mechanism (not shown).

Specifically, as illustrated, the control ASIC 110 includes a PID interrupt unit 111, a motor control unit 112, a reading control unit 113, a shift control unit 114, a shift generation unit 115, and an LED driver unit 116.

The PID interrupt unit 111 interrupts a predetermined period in the PID control of the DC motor (driving motor) 310 controlled by the motor control unit 112 described below and performs various calculations to obtain a target speed of the DC motor 310. For example, the PID interrupt unit 111 calculates a speed deviation (speed difference) between the target speed and an actual speed of the DC motor 310 and calculates a proportional element, an integration element, and a differential element based on the speed deviation. The PID interrupt unit 111 determines a control value (duty ratio) so that the DC motor 310 follows the target speed based on the calculation result and notifies the motor control unit 112 of the control value.

The motor control unit 112 controls (PID-controls) the DC motor (driving motor) 310 of the ADF 300, transports the document of the sheet feeding tray, and passes the document through the image reading window. For example, the motor control unit 112 can perform "constant speed driving", "deceleration driving", "stop control", "driving termination control", "driving preparation control", and "acceleration driving" of the DC motor 310. Here, the term "constant speed driving" refers to a driving operation of rotating the DC motor 310 at a constant speed. The term "deceleration driving" refers to a driving operation of gradually decelerating the rotation speed of the DC motor 310. The term "stop control" refers to a control operation of allowing the DC motor 310 to stop without rotation. The term "driving termination control" refers to a control operation of blocking the power supply to the DC motor 310. The term "driving preparation control" refers to a control operation of starting (including resuming) of the power supply to the DC motor 310. The term "acceleration driving" refers to a driving operation of gradually accelerating the rotation speed of the DC motor 310.

The reading control unit 113 controls image reading of the image sensor 220. Specifically, the reading control unit 113 supplies a shift pulse to the image sensor 220 and controls a transmission timing (subsequent start timing of charge accumulation) at which the charges accumulated in the photoelectric conversion element are transmitted to the shift register. Moreover, the reading control unit 113 supplies a reading clock to the image sensor 220 and controls the output of the charges stored in the shift register to the A/D conversion unit 120. At this time, the data (analog data) output from the image sensor 220 is converted into the digital data by the A/D conversion unit 120 and is subjected to various kinds of corrections by the data processing unit 130.

The reading control unit 113 notifies the data processing unit 130 of an instruction signal and stores (buffers) the data subjected to the various kinds of corrections in the storage unit 140. Hereinafter, a mode in which the data (image data) read by the image sensor 220 is stored in the storage unit 140 is referred to as a "reading mode".

As described, when the storage unit 140 comes to be in the near full state and the transport of the document is stopped in the ADF 300, the storage unit 140 stops receiving the data. At this time, the reading control unit 113 does not store (stops the buffering) the data (image data) read by the image sensor 220 in the storage unit 140. Hereinafter, a mode in which the data (image data) read by the image sensor 220 is not stored in the storage unit 140 is referred to as a "buffering stop mode".

The reading control unit 113 allows the carriage 200 to be stopped below the image reading window when reading the document by using the ADF 300. Of course, when reading the document placed on the document platen by using no ADF 300, the reading control unit 113 can control the movement of the carriage 200 by controlling the rotation of the motor of the carriage driving mechanism.

The shift generation unit 115 generates a shift pulse which the reading control unit 113 outputs to the image sensor 220. For example, the shift generation unit 115 generates a shift pulse (Trigger A) serving as a trigger of reading start (reading initially performed after the DC motor 310 is driven). The shift generation unit 115 generates a shift pulse (Trigger B) serving as a trigger for lighting the red (R) LED light source 210. The shift generation unit 115 generates a shift pulse (Trigger C) serving as a trigger for transmitting the image data (the charges accumulated in the photoelectric conversion element) read before the rotation stoppage of the DC motor 310 during the rotation stoppage of the DC motor 310 or a trigger for controlling LED synchronization. The shift generation unit 115 generates a shift pulse (Trigger D) serving as a trigger for lighting the green (G) or blue (B) LED light source 210.

The shift control unit 114 controls the respective units (111 to 113, 115, and 116) based on the shift pulse generated by the shift generation unit 115. For example, the shift control unit 114 instructs the LED driver unit 116 to control lighting-up and turning-off of the LED light source 210, the LED synchronization, and the like. The shift control unit 114 instructs the reading control unit 113 to transmit the image data (the charges accumulated in the photoelectric conversion element) read before the rotation stoppage of the DC motor 310 or instructs the reading control unit 113 to resume the image reading.

The LED driver unit 116 controls the lighting-up and turning-off of the LED light source 210 according to the reading operation of the image sensor 220. Specifically, the LED driver unit 116 sequentially lights up the red (R), green (G), and blue (B) LED light sources 210 at timings at which the shift pulses are supplied from the reading control unit 113 to the image sensor 220. An operation of continuously lighting up each of the red (R), green (G), and blue (B) LED light sources 210 once to read one line of the normal document is referred to as "continuous lighting".

The LED driver unit 116 lights up the LED light source 210 and also determines the LED light source (Next LED) 210 to be subsequently lit. That is, when the "continuous lighting" is repeated to sequentially light up the red (R), green (G), and blue (B) LED light sources 210, the red (R) LED light source 210 is lit and the green (G) LED light source 210 is determined as a subsequently lit LED light source 210. Likewise, the green (G) LED light source 210 is lit and the blue (B) LED light source 210 is determined as a subsequently lit LED light source 210. Likewise, the blue (B) LED light source 210 is lit and the red (R) LED light source 210 is determined as the subsequently lit LED light source 210.

When the reading is resumed after the stoppage of the document reading, the LED driver unit 116 completes the "continuous lighting" corresponding to at least two lines of the document before the re-driving of the DC motor 310 and lights up the LED light source 210 of the color scheduled to be initially lit when re-driving the DC motor 310. For example, when the LED light source 210 of the color scheduled to be initially lit when re-driving the DC motor 310 is the red (R) LED light source 210, the LED driver unit 116 determines the red (R) LED light source 210 as the subsequently lit LED light source (Next LED) 210 immediately before the DC motor 310 is re-driven.

The control ASIC 110 can be configured by ASIC designed to be dedicated to perform processings of the respective units (111 to 116). Moreover, the control ASIC 110 may be configured by a computer which includes a CPU serving as a main control device, a ROM storing programs or the like, and a RAM serving as a main memory and temporarily storing data or the like.

The image reading apparatus 50 according to this embodiment has a configuration described above. The main constituent units of the configuration will be described when the features of the invention are described, but the invention is not limited to this configuration. Moreover, the image reading apparatus may include another configuration of a general image reading apparatus. The image reading apparatus 50 may be a multi-functional apparatus which has a print function, a facsimile function, and the like. The A/D conversion unit 120 may be mounted on the substrate of the carriage 200.

The above-described constituent units have been classified according to the main processing operations in order to facilitate understanding of the configuration of the image reading apparatus 50. The invention is not limited to the method of classifying the constituent units or the names of the constituent units. The configuration of the image reading apparatus 50 may be classified into the more constituent units according to the processing operations. Moreover, one constituent unit may be classified so as to perform more processings. Furthermore, the processing of each constituent unit may be performed by one hardware unit or a plurality of hardware units.

Next, the characteristic operations of the image reading apparatus 50 having the above-described configuration will be described.

Image Reading Control

Figure 2:
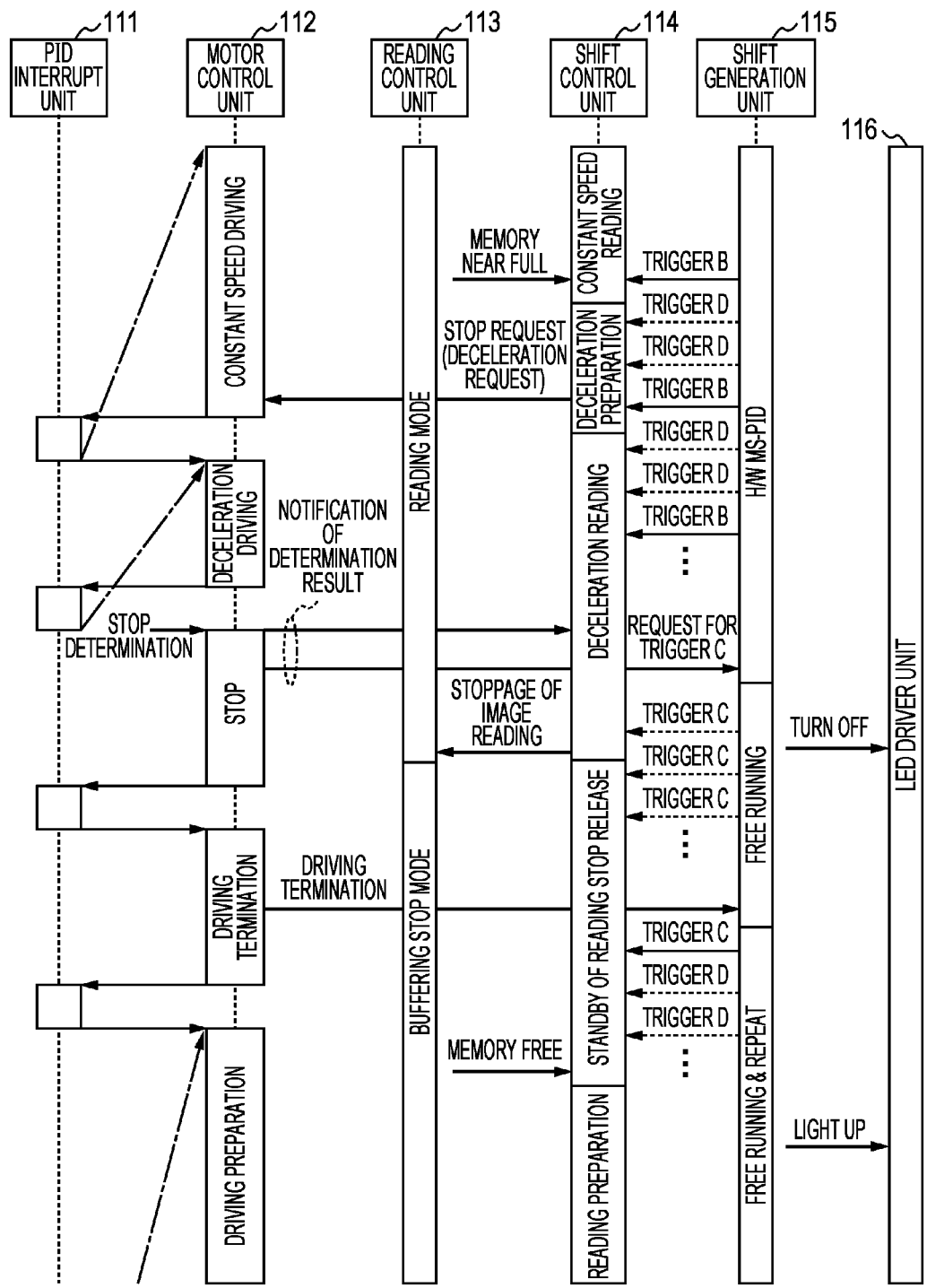
FIG. 2 is a timing chart (first half) illustrating an example of image reading control.
Figure 3:
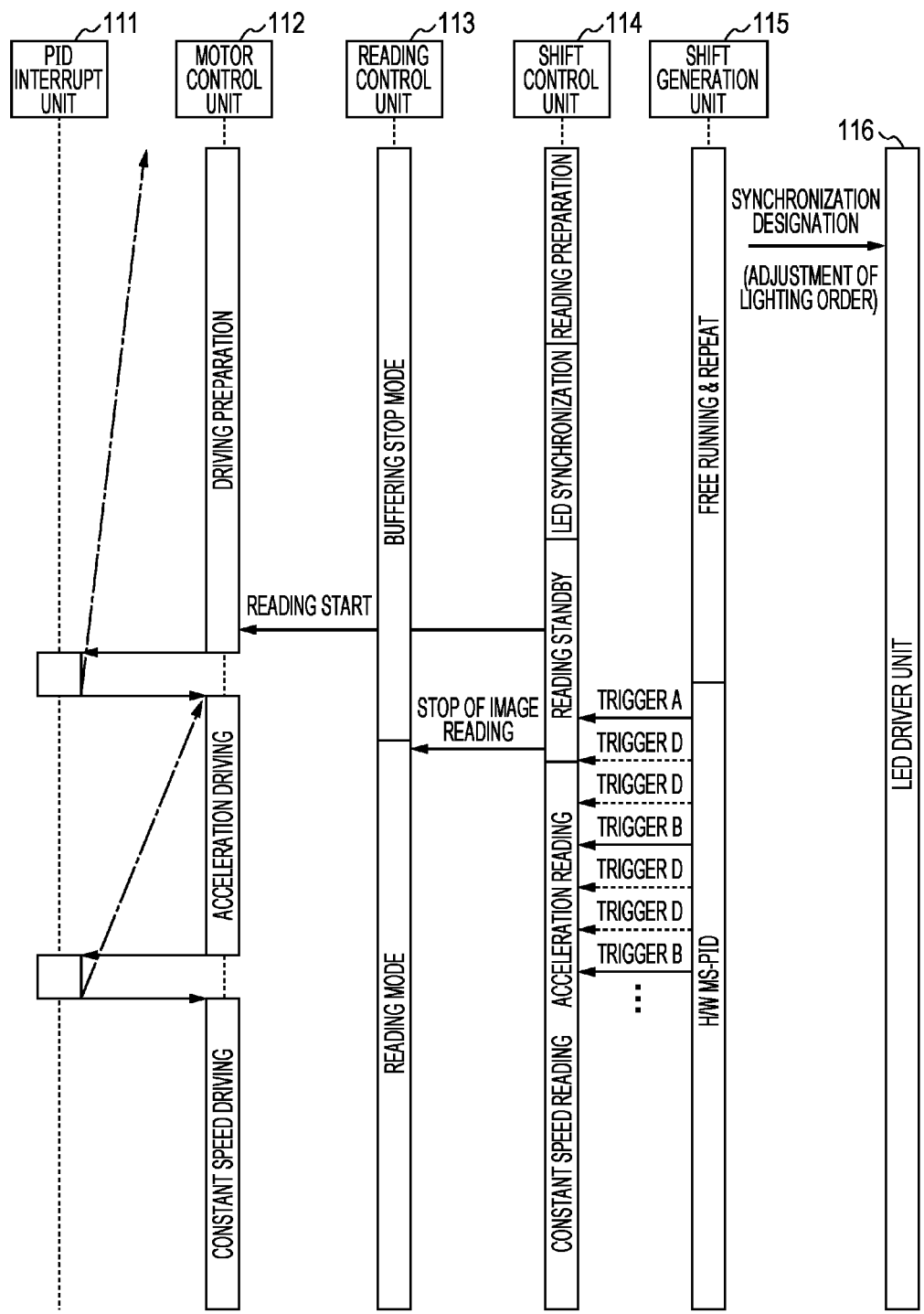
FIG. 3 is a timing chart (second half) illustrating an example of the image reading control.

FIGS. 2 and 3 are timing charts illustrating an example of image reading control (document reading control) performed by the image reading apparatus 50 according to this embodiment. FIGS. 4, 5, 6, and 7 are diagrams illustrating the light timing and each control signal of the LED light source 210 in the image reading control.

In the timing charts in FIGS. 2 and 3, a case is shown in which the storage unit 140 comes to be in the near full state during the reading of the image data and the DC motor 310 of the ADF 300 is stopped.

At the start point of the timing chart, as shown in FIG. 2, the reading control unit 113 reads the image data while the motor control unit 112 drives the DC motor 310 at a constant speed (while a document is transported at a constant speed) ("reading mode").

Figure 4:
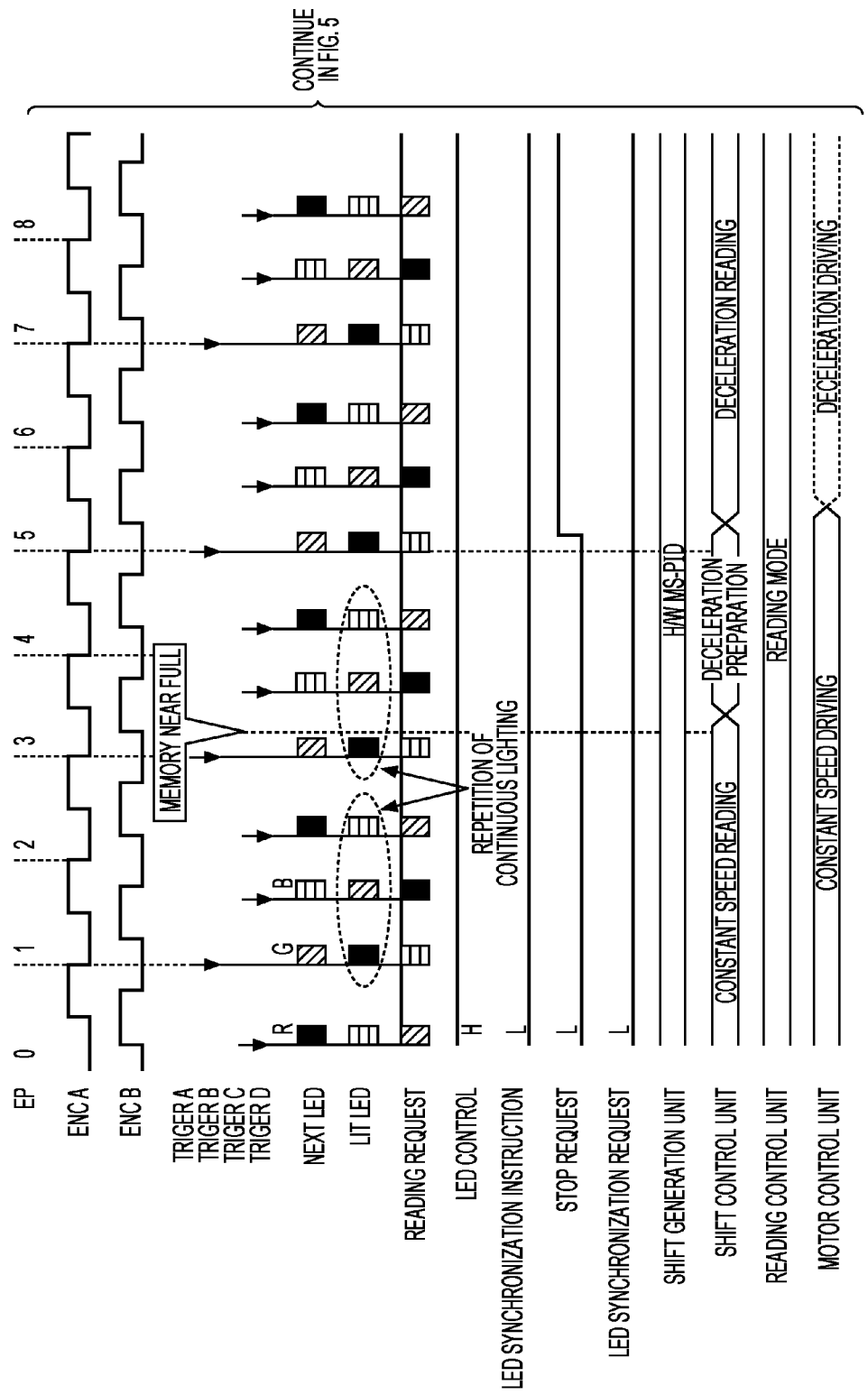
FIG. 4 is a first diagram illustrating lighting timing and each control signal of an LED light source in the image reading control.

At this time, the shift generation unit 115 repeatedly generates the shift pulse (Trigger B) serving as the trigger for lighting the red (R) LED light source 210, the shift pulse (Trigger D) serving as the trigger for lighting the green (G) LED light source 210, and the shift pulse (Trigger D) serving the as the trigger for lighting the blue (B) LED light source 210 in sequence based on the pulses (pulses output according to the rotation amount of the transport roller) output from the encoder of the DC motor 310. In FIG. 4, the pulses output from the DC motor 310 are shown ("ENC A" and "ENC B"). In the illustrated example, the shift generation unit 115 generates the shift pulse serving as Trigger B at downward timings (EP0, EP3, EP5, and EP7) of "ENC A", and then generates the shift pulse serving as Trigger D at a predetermined interval twice.

The shift control unit 114 notifies the LED driver unit 116 of an instruction to light up each of the colors (R, G, and B) at a generation timing of each shift pulse generated by the shift generation unit 115 and notifies the reading control unit 113 of an instruction to output each shift pulse.

The LED driver unit 116 continues to light up the red (R), green (G), and blue (B) LED light sources 210 once in response to the lighting instruction from the shift control unit 114 (continuous lighting). In the example shown in FIG. 4, the LED driver unit 116 lights up the red (R) LED light source 210 at the generation timing of the shift pulse serving as Trigger B (lighting LED) and determines the green (G) LED light source 210 as the LED to be subsequently lit (Next LED). Likewise, the LED driver unit 116 lights up the green (G) LED light source 210 at the generation timing of the shift pulse serving as Trigger D (lighting LED) and determines the blue (B) LED light source 210 as the LED to be subsequently lit. Subsequently, the LED driver unit 116 lights up the blue (B) LED light source 210 at the generation timing of the shift pulse serving as Trigger D (lighting LED) and determines the red (R) LED light source 210 as the LED to be subsequently lit (Next LED). In the drawing, the red (R) LED light source 210 is indicated by a black color rectangle, the green (G) LED light source 210 is indicated by a diagonal line rectangle, and the blue (B) LED light source 210 is indicated by a transverse line rectangle. Of course, the lighting time of each color is different for each color and the illustrated rectangles do not indicate the lighting time.

The reading control unit 113 outputs the shift pulse to the image sensor 220 in response to the notification (the instruction to output the shift pulse) from the shift control unit 114. Accordingly, in the image sensor 220, the charges accumulated in the photoelectric conversion element are transmitted to the shift register (of course, the next charge accumulation is started). In the example shown in FIG. 4, the charges accumulated in the photoelectric conversion element by lighting up the red (R) LED light source 210 are transmitted to the shift register at the timing at which the shift pulse for lighting up the green (G) LED light source 210 is supplied. Likewise, the charges accumulated in the photoelectric conversion element by lighting up the green (G) LED light source 210 are transmitted to the shift register at the timing at which the shift pulse for lighting up the blue (B) LED light source 210 is supplied. Moreover, the charges accumulated in the photoelectric conversion element by lighting up the blue (B) LED light source 210 are transmitted to the shift register at the timing at which the shift pulse for lighting up the red (R) LED light source 210 is supplied.

The reading control unit 113 gives a reading request to the image sensor 220 (specifically, supplies a predetermined reading clock to the image sensor 220), the charges transmitted to the shift register are stored as data in the storage unit 140 via the A/D conversion unit 120 and the data processing unit 130.

Referring back to FIG. 2, when the storage unit 140 detects the near full state (which is a state where the amount of data exceeds a predetermined value) during the reading of the image data, the storage unit 140 notifies the shift control unit 114 of the detection result. Then, when the shift control unit 114 receives the notification, the shift control unit 114 waits for the shift generation unit 115 to generate the shift pulse (Trigger B) serving as the trigger for lighting the subsequent red (R) LED light source 210 (deceleration preparation) and notifies the motor control unit 112 of an instruction to switch from "constant speed driving" to "deceleration driving" (specifically, a stop request signal is set to be High, as shown in FIG. 4). Moreover, the shift control unit 114 instructs the shift generation unit 115 to adjust the generation timing of the shift pulse so that the document is readable, even while the DC motor 310 performs the deceleration driving (that is, the document is transported during the deceleration).

The motor control unit 112 drives the DC motor 310 of the ADF 300 to decelerate the document when the motor control unit 112 receives the instruction to switch from the "constant speed driving" to the "deceleration driving". Then, the shift generation unit 115 gradually increases the generation interval of the shift pulse so that the reading control unit 113 can perform reading (deceleration reading) during the deceleration driving.

Figure 5:
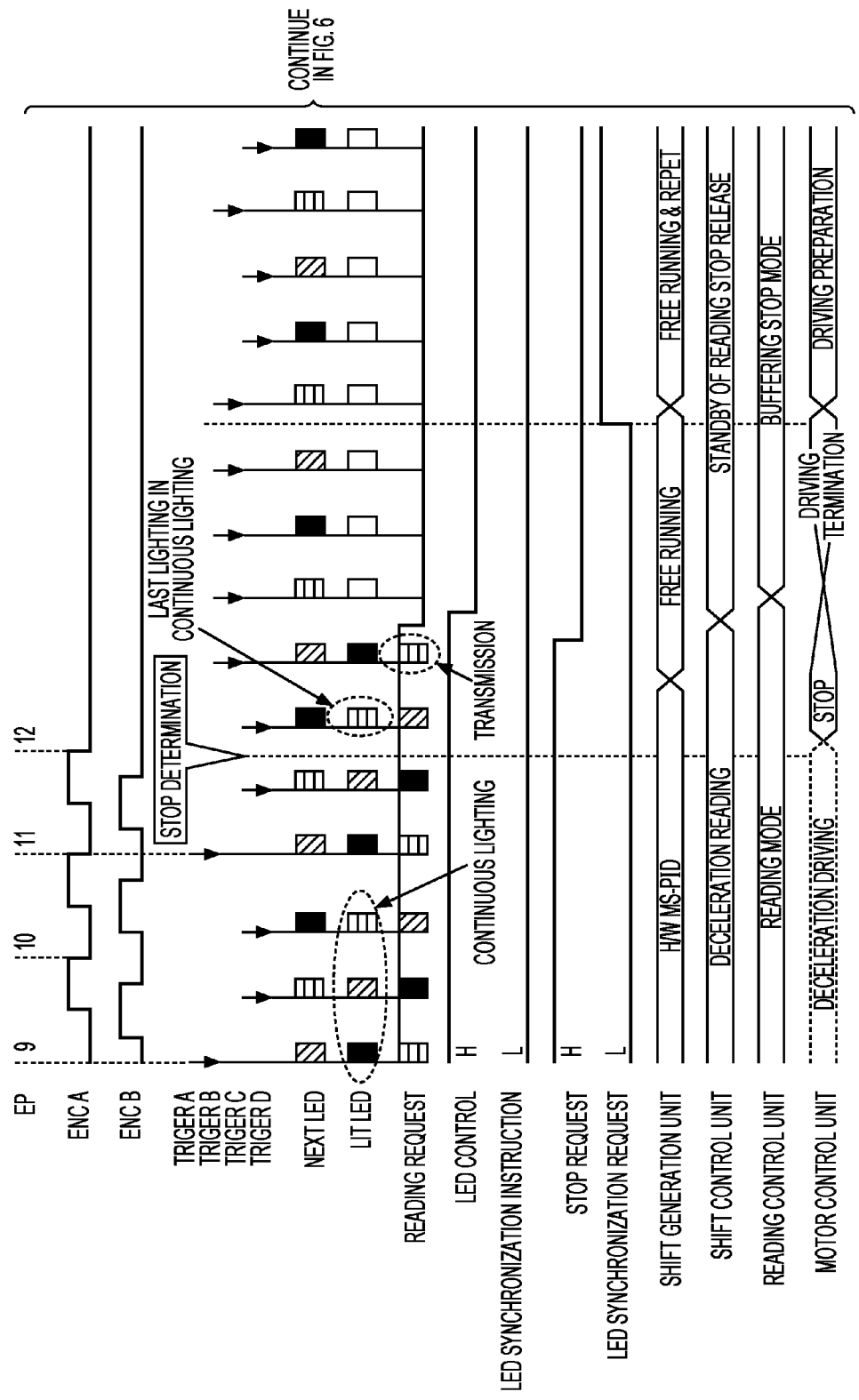
FIG. 5 is a second diagram illustrating the lighting timing and each control signal of the LED light source in the image reading control.

During the deceleration reading, the motor control unit 112 determines whether the rotation of the DC motor 310 stops based on the pulses ("ENC A" and "ENC B") output from the encoder of the DC motor 310. Here, the motor control unit 112 determines that the rotation of the DC motor 310 stops, the motor control unit 112 switches from the "deceleration driving" to "stop control" (in this case, as shown in FIG. 5, the stop request signal is set to be Low and this state is referred to as "stop request release") and makes the DC motor 310 stop so that the DC motor 310 does not rotate from the stopped position (stop control). Moreover, the motor control unit 112 notifies the shift control unit 115 or the shift generation unit 116 of the determination result that the rotation of the DC motor 310 stops.

Thus, when the storage unit 140 becomes nearly full and thus the DC motor 310 of the ADF 300 stops, as shown in FIG. 5, the pulses ("ENC A" and "ENC B") from the encoder of the DC motor 310 are not output. According to the related art, since no shift pulse can be generated in the shift generation unit 115, the shift pulse is not supplied from the reading control unit 113 to the image sensor 220.

As shown in FIG. 5, in some cases, the rotation of the DC motor 310 stops (stop determination) during the reading of the image data corresponding to one line (in the illustrated example, the stop determination is performed before the green (G) LED light source 210 and the blue (B) LED light source 210 are lit up). In this case, according to the related art, the shift pulse is not supplied from the reading control unit 113 to the image sensor 220. Therefore, after the DC motor 310 stops, the charges accumulated in the photoelectric conversion element may not be transmitted to the shift register. The image data being read when the DC motor 310 stops has to be transmitted to the shift registered after the reading resumes (after the re-driving of the DC motor 310). However, while the DC motor 310 is stopped, the charges continue to be accumulated in the photoelectric conversion element. Therefore, even when the reading resumes and then the charges accumulated in the photoelectric conversion element are transmitted to the shift register, dark noise may be contained in the image data.

In the image reading apparatus 50 according to the invention, the shift pulses can be supplied to the image sensor 220 at an appropriate timing even after the DC motor 310 stops.

Specifically, when the notification of the determination result (also referred to as "a request for Trigger C") that the rotation of the DC motor 310 stops is given, the shift generation unit 115 according to this embodiment generates the shift pulse serving as Trigger C independently from the rotation of the DC motor 310. As shown in FIG. 5, the shift generation unit 115 continues to generate shift pulse serving as Trigger C at a predetermined interval (an interval at which the respective R, G, and B colors can be read) after a notification of the determination result of the rotation stoppage of the DC motor 310 is given.

After the notification of the determination result that the rotation of the DC motor 310 stops is given, the shift control unit 114 notifies the reading control unit 113 of an instruction to output the shift pulse at the generation timing of the shift pulse serving as Trigger C. At this time, the reading control unit 113 responds to the notification given from the shift control unit 114 and outputs the shift pulses to the image sensor 220. Accordingly, in the image sensor 220, the charges accumulated in the photoelectric conversion element are transmitted to the shift register. The charges (data) transmitted to the shift register are transmitted to the storage unit 140 via the A/D conversion unit 120 and the data processing unit 130.

Thus, in the image reading apparatus 50 according to this embodiment, even when the rotation of the DC motor 310 stops, the data (in the example shown in FIG. 5, the data corresponding to the charges accumulated in the photoelectric conversion element when the blue (B) LED light source 210 is lit up) corresponding to one line read finally at the stopped position can be transmitted to the storage unit 140 after stoppage (after stoppage of the transport of the document). Therefore, even when the DC motor 310 stops during the reading of the document, clear image data having no dark noise can be obtained.

After the data corresponding to one line read finally at the stopped position of the DC motor 310 is transmitted to the shift register, the shift control unit 114 gives a request for stopping the image reading to the image reading unit 113 (specifically, as shown in FIG. 5, the reading request signal is set to be Low).

When the image reading is not performed after the rotation stoppage of the DC motor 310, it is not necessary to light the LED light source 210. Therefore, the LED driver unit 116 turns off the LED light source 210 after the data corresponding to one line read finally at the stopped position of the DC motor 310 is transmitted to the shift register.

At this time, when the notification of the determination result that the rotation of the DC motor 310 stops is given, the shift control unit 115 instructs the LED driver unit 116 to turn off the LED light source 210 (specifically, as shown in FIG. 5, the LED control signal is set to be Low). Then, the LED driver unit 116 receiving this instruction turns off the LED light source 210. Thus, it is possible to reduce the unnecessary power consumption. In FIG. 5, the turned off LED light source 210 is indicated by a blank rectangle.

However, even when the LED light source 210 is turned off, as shown in FIG. 5, the LED driver unit 116 continues to perform the process of determining the LED light source 210 of each color (one of R, G, and B) at the generation timing of the shift pulse serving as Trigger C as the LED to be subsequently lit up (Next LED).

The shift control unit 114 gives the image reading unit 113 a request for stopping the image reading, and then waits until the memory of the storage unit 140 becomes free (less than a predetermined amount of data) (standby of reading stoppage release).

Then, the reading control unit 113 stops the image reading ("buffering stop mode"). At this time, for example, the reading control unit 113 may stop supply of the shift pulses to the image sensor 220.

Thus, the storage unit 140 stops receiving the data. Then, the storage unit 140 transmits only the data to the output unit 150 and does not receive the subsequent data until the memory becomes free. In this way, the state of the storage unit 140 is changed from the near full state to the memory free state.

Moreover, the motor control unit 112 blocks supply of the power to the DC motor 310 after the rotation of the DC motor 310 stops and then a predetermined time passes (driving termination control). The motor control unit 112 also notifies the shift generation unit 116 of the driving termination (specifically, as shown in FIG. 5, an LED synchronization request signal is set to be High). Then, the motor control unit 112 resumes the supply of the power to the DC motor 310 and prepares the driving of the DC motor 310 (driving preparation).

On the other hand, when the shift generation unit 116 receives the notification of the driving termination, the shift generation unit 116 repeatedly generates the shift pulse (Trigger C) scheduled to serve as a trigger for lighting up the red (R) LED light source 210, the shift pulse (Trigger D) scheduled to serve as a trigger for lighting up the green (G) LED light source 210, and the shift pulse (Trigger D) scheduled to serve as a trigger for lighting up the blue (B) LED light source 210 in sequence. Specifically, when the shift generation unit 116 receives the notification of the driving termination, as shown in FIG. 5, the shift generation unit 116 repeatedly generates the shift pulse serving as Trigger C at a predetermined interval (an interval at which all of the R, G, and B colors are readable). In addition, whenever the shift generation unit 116 generates the shift pulse serving as Trigger C, the shift generation unit 116 generates the shift pulse serving as Trigger D twice at a predetermined interval (an interval at which each of the R, G, and B colors is readable). Both the shift pulses serving as Trigger C and Trigger D are generated so as to be independent from the rotation of the DC motor 310.

Figure 6:
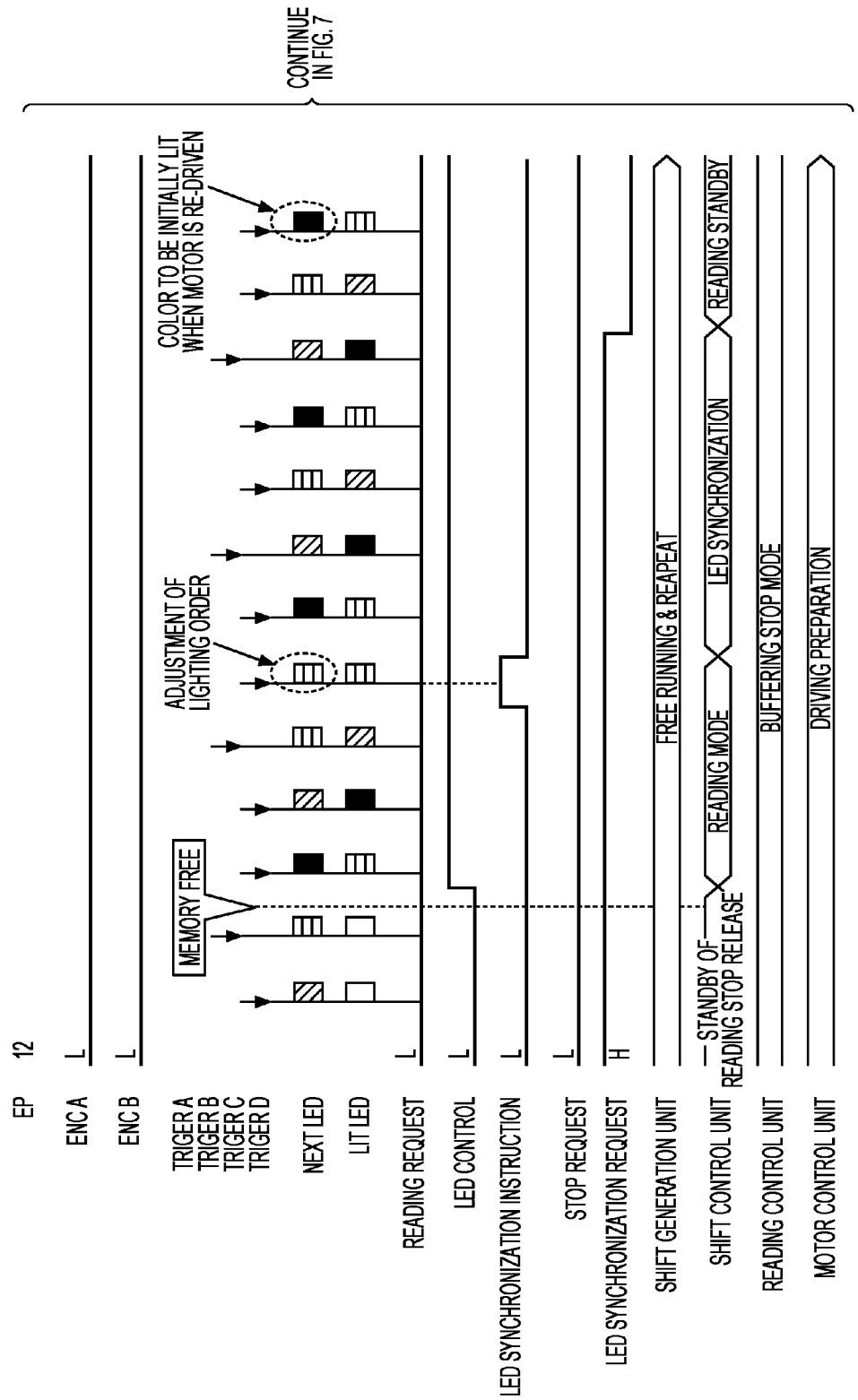
FIG. 6 is a third diagram illustrating the lighting timing and each control signal of the LED light source in the image reading control.

Referring back to FIG. 2, when the storage unit 140 detects that the memory is free (the amount of data is less than a predetermined value), the storage unit 140 notifies the shift control unit 114 of the detection result. When the shift control unit 114 receives the notification, the shift control unit 114 instructs the LED driver unit 116 to light up the LED light source 210 (specifically, as shown in FIG. 6, the LED control signal is set to be High). Then, the LED driver unit 116 receiving the instruction lights up the LED light source 210 of the color (in the example shown in FIG. 6, the blue color) determined at the generation timing of the previous shift pulse (in the example shown in FIG. 6, the shift pulse serving as Trigger C).

At this time, as shown in FIG. 3, the shift control unit 114 waits a predetermined time (reading preparation), and then instructs the LED driver unit 116 to adjust the lighting order of the LED light sources 210 (specifically, as shown in FIG. 6, the LED synchronization instruction pulse is supplied to the LED driver unit 116).

Here, the reason for adjusting the lighting order is that the image data is not appropriately readable when the LED light source 210 of the color scheduled to be initially lit up is not lit up at the time of resuming (motor re-driving) the reading (EP 13 shown in FIG. 6).

In this embodiment, however, the number of shift pulses, which continuously serve as Trigger C, generated by the shift generation unit 116 is not determined during the period ("Free Running" shown in FIG. 5) from the rotation stoppage of the DC motor 310 to the driving termination. However, the determination of the color (the LED light source 210) to be subsequently lit up is repeated in the order of the red (R), green (G), and blue (B) colors (Next LED). As a consequence, there is a concern that the LED light source 210 of the color (in this embodiment, the red color) to be lit up at the generation timing of the shift pulse serving as Trigger C is not lit up during the period (a period of "Free Running & Repeat" shown in FIGS. 5 and 6) after the "Free Running" (in the example shown in FIG. 6, the blue LED light source 210 is lit up at the generation timing of the shift pulse serving as Trigger C).

Therefore, the LED driver unit 116 according to this embodiment adjust the lighting order of the LED light sources 210 based on the instruction from the shift control unit 114 (adjustment of lighting order).

Specifically, the LED driver unit 116 determines the shift pulses generated by the shift generation unit 115 at the supply timing of the LED synchronization instruction pulse and determines the color (the LED light source 210) to be subsequently lit up.

For example, the LED driver unit 116 determines the green (G) color as the color (the LED light source 210) to be subsequently lit up, when the shift pulse generated by the shift generation unit 115 is the shift pulse serving as Trigger C at the supply timing of the LED synchronization instruction pulse. Likewise, the LED driver unit 116 determines the blue (B) color as the color (the LED light source 210) to be subsequently lit up, when the shift pulse generated by the shift generation unit 115 is the shift pulse serving as first Trigger D at the supply timing of the LED synchronization instruction pulse after the generation of the shift pulse serving as Trigger C. Moreover, the LED driver unit 116 determines the red (R) color as the color (the LED light source 210) to be subsequently lit up, when the shift pulse generated by the shift generation unit 115 is the shift pulse serving as second Trigger D at the supply timing of the LED synchronization instruction pulse after the generation of the shift pulse serving as Trigger C. In the example shown in FIG. 6, since the shift pulse generated by the shift generation unit 115 is the shift pulse serving as first Trigger D at the supply timing of the LED synchronization instruction pulse, the LED driver unit 116 determines the blue (B) color as the color (the LED light source 210) to be subsequently lit up ("the adjustment of the lighting order": "Next LED" surrounded by a dotted line).

Accordingly, whenever the shift pulse serving as Trigger C is generated after the adjustment of the lighting order, the red (R) LED light source 210 is necessarily lit up and the color (red) LED light source 210 scheduled to be initially lit up at the time (EP 13) of the resuming (the motor re-driving) of the reading can be lit up. As a consequence, after the resuming (the motor re-driving) of the reading, it is not necessary to adjust the lighting order of the LED light sources 210 and thus line missing does not occur in the read image.

After the adjustment of the lighting order, the shift control unit 114 instructs the LED driver unit 116 to perform continuous lighting corresponding to at least two lines (LED synchronization). That is, after the adjustment of the lighting order of the LED light sources 210, the LED driver unit 116 completes the continuous lighting corresponding to at least two lines before the resuming (motor re-driving) of the reading. Thus, when the motor is re-driven, the stabilized lighting of the LED light source 210 and image reading can be performed.

Referring back to FIG. 3, after the completion of the continuous lighting corresponding to at least two lines, the shift control unit 114 waits a predetermined time (reading standby), and then instructs the motor control unit 112 to re-drive the DC motor 310. Based on the instruction, the motor control unit 112 re-drives the DC motor 310 of the ADF 300 (acceleration driving and constant speed driving).

After the re-driving of the DC motor 310, as shown in FIG. 7, the encoder of the DC motor 310 resumes the output of the pulses ("ENC A" and "ENC B") and the shift generation unit 115 generates the shift pulse (Trigger A) serving as the trigger of the resuming of the reading.

Then, the shift control unit 114 notifies the LED driver unit 116 of an instruction to light up the color (in this embodiment, the red color) scheduled to be initially lit up at the timing at which the shift generation unit 115 generates the shift pulse serving as Trigger A. Here, the LED driver unit 116 responds to the lighting instruction from the shift control unit 114 and lights up the red (R) LED light source 210 scheduled to be initially lit up after the re-driving of the DC motor 310.

Then, the shift generation unit 115 generates the shift pulse (Trigger D) serving as the trigger for lighting up the green (G) LED light source 210 and the shift pulse (Trigger D) serving as the trigger for lighting up the blue (B) LED light source 210 based on the pulses output from the encoder of the DC motor 310. Thereafter, the shift generation unit 115 repeatedly generates the shift pulse (Trigger B) serving as the trigger for lighting up the red (R) LED light source 210, the shift pulse (Trigger D) serving as the trigger for lighting up the green (G) LED light source 210, and the shift pulse (Trigger D) serving as the trigger for lighting up the blue (B) LED light source 210 in sequence.

Then, the shift control unit 114 notifies the LED driver unit 116 of an instruction to light up each of the colors (R, G, and B) at the timing at which the shift generation unit 115 generates each shift pulse and notifies the reading control unit 113 of an instruction to output each shift pulse.

The LED driver unit 116 responds to the lighting instruction from the shift control unit 114 to continuously light up the LED light sources 210.

As shown in FIG. 3, the shift control unit 114 gives the image reading unit 113 a request for resuming the image reading at the timing at which the shift generation unit 115 generates the shift pulse serving as Trigger A (specifically, as shown in FIG. 7, the reading request signal is set to be High).

Then, the reading control unit 113 resumes the reading of the image data in accordance with the driving (the acceleration driving or the constant speed driving) of the DC motor 310 by the motor control unit 112 ("reading mode"). Of course, specifically, the reading control unit 113 responds to the notification (the instruction to output the shift pulse) from the shift control unit 114 as in the control before the stoppage of the DC motor 310, outputs the shift pulse to the image sensor 220, and resumes the reading of the image data by the image sensor 220.

The image reading apparatus 50 according to this embodiment controls the above-described image reading to read the image without deterioration in the image even when the DC motor 310 of the ADF 300 stops during the image reading.

The processing unit in each timing chart described above is divided according to the main processed details in order to facilitate the understanding of the image reading apparatus 50. The invention is not limited to the method of classifying the processes and the names of the processes. The processes of the image reading apparatus 50 can be further divided into more processes. One process may be performed by more processes. Moreover, each process may be performed together with another process.

The above-described embodiment is intended to exemplify the gist of the invention and thus the invention is not limited thereto. It should be apparent to those skilled in the art that substitutions, changes, and modifications of the invention can be made.

For example, in the above-described embodiment, the lighting order of the LED light sources 210 is RGB when the reading corresponding to one line is performed. However, the invention is not limited thereto. In the above-described embodiment, three-color LED light sources 210 are used. However, the invention is not limited thereto, but the invention is applicable to all apparatuses lighting up the LED light sources 210 of a plurality of colors in predetermined order.

In the above-described embodiment, when the storage unit 140 comes to be in the near full state, the rotation of the DC motor 310 of the ADF 300 stops. However, the invention is not limited thereto. For example, when an error occurs in the image reading apparatus 50, the rotation of the DC motor 310 may stop.

What is claimed is:

1. An image reading apparatus comprising:
    an ADF driven by a motor;
    an image reading unit transmitting charges accumulated in a photoelectric conversion element as a shift pulse to a shift register; and
    a shift pulse control unit controlling an output timing of the shift pulse based on rotation of the motor,
    wherein when the rotation of the motor stops, the shift pulse control unit outputs the shift pulse to transmit the charges accumulated in lighting of a light source immediately before the stoppage of the motor.

2. The image reading apparatus according to claim 1,
    wherein the image reading unit accumulates the charges by lighting up light sources of N colors (where N is an integer equal to or larger than 1) sequentially in a predetermined order at the output timing of the shift pulse, and
    wherein the shift pulse control unit outputs the shift pulse until the charges accumulated in the lighting-up of at least an N-th light source of the predetermined order have been transmitted after the rotation of the motor stops.

3. The image reading apparatus according to claim 1,
    wherein the image reading unit accumulates the charges by lighting up light sources of N colors (where N is an integer equal to or larger than 1) sequentially in a predetermined order at the output timing of the shift pulse, and
    wherein when the rotation of the motor stops and then the motor is re-driven to resume reading a document, the image reading unit completes the lighting-up of an N-th light source of the predetermined order before the re-driving of the motor and lights up the light source of the color scheduled to be initially lit up in the predetermined order in the re-driving of the motor.

4. The image reading apparatus according to claim 3, wherein the image reading unit completes the lighting-up of the light source corresponding to at least two lines up to N-th of the predetermined order before the motor is re-driven.

5. The image reading apparatus according to claim 3, wherein the image reading unit sequentially lights up the light sources of three RGB colors corresponding to the N colors.

6. The image reading apparatus according to claim 3, wherein the image reading unit completes the lighting of the N-th light source of the predetermined order before driving of the motor and lights up the light source of the color scheduled to be the initially lit up in the predetermined order in the driving of the motor.

7. The image reading apparatus according to claim 1, further comprising:
    a motor control unit controlling the motor,
    wherein the motor control unit stops the rotation of the motor when a memory storing pixel data generated based on the charges transmitted to the shift register becomes a near full state.

* * * * *